W. S. LITTLE.
SAW SET.
APPLICATION FILED OCT. 14, 1912.
1,055,061.
Patented Mar. 4, 1913.
2 SHEETS—SHEET 1.
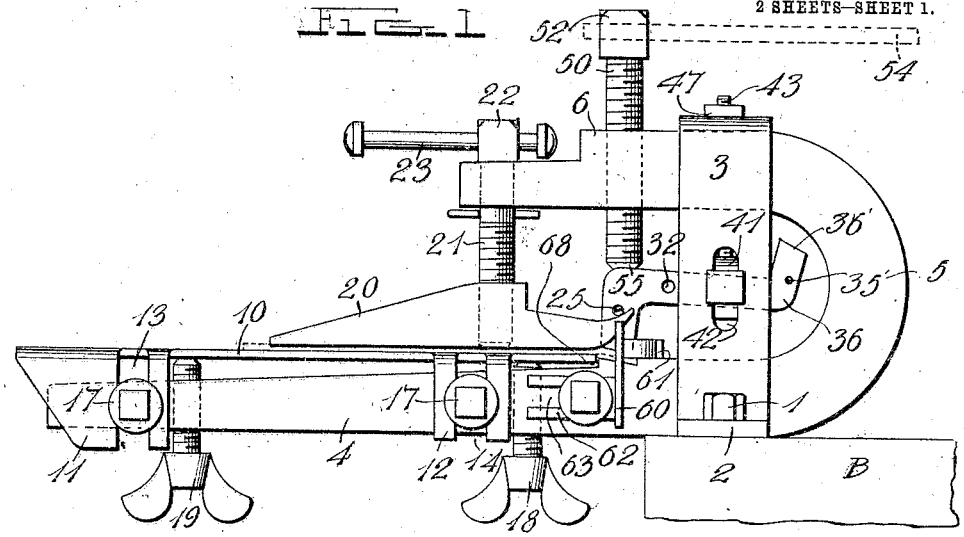
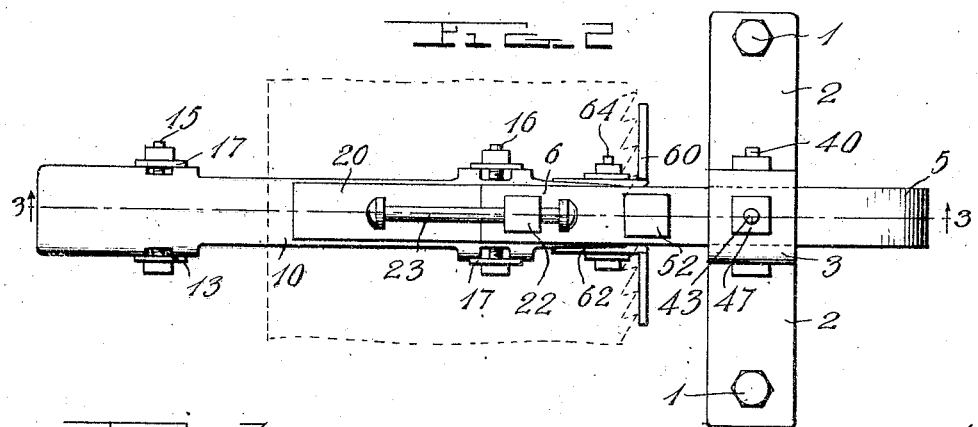
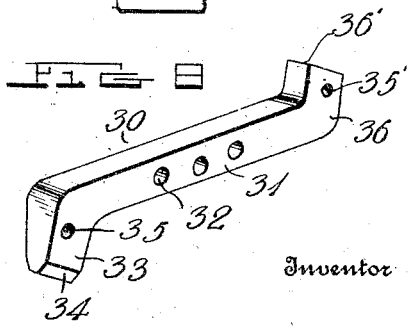
Witnesses
A. Van Loock
N. L. Collamer
Inventor
W. S. Little
By H. B. Willson & Co.
Attorneys

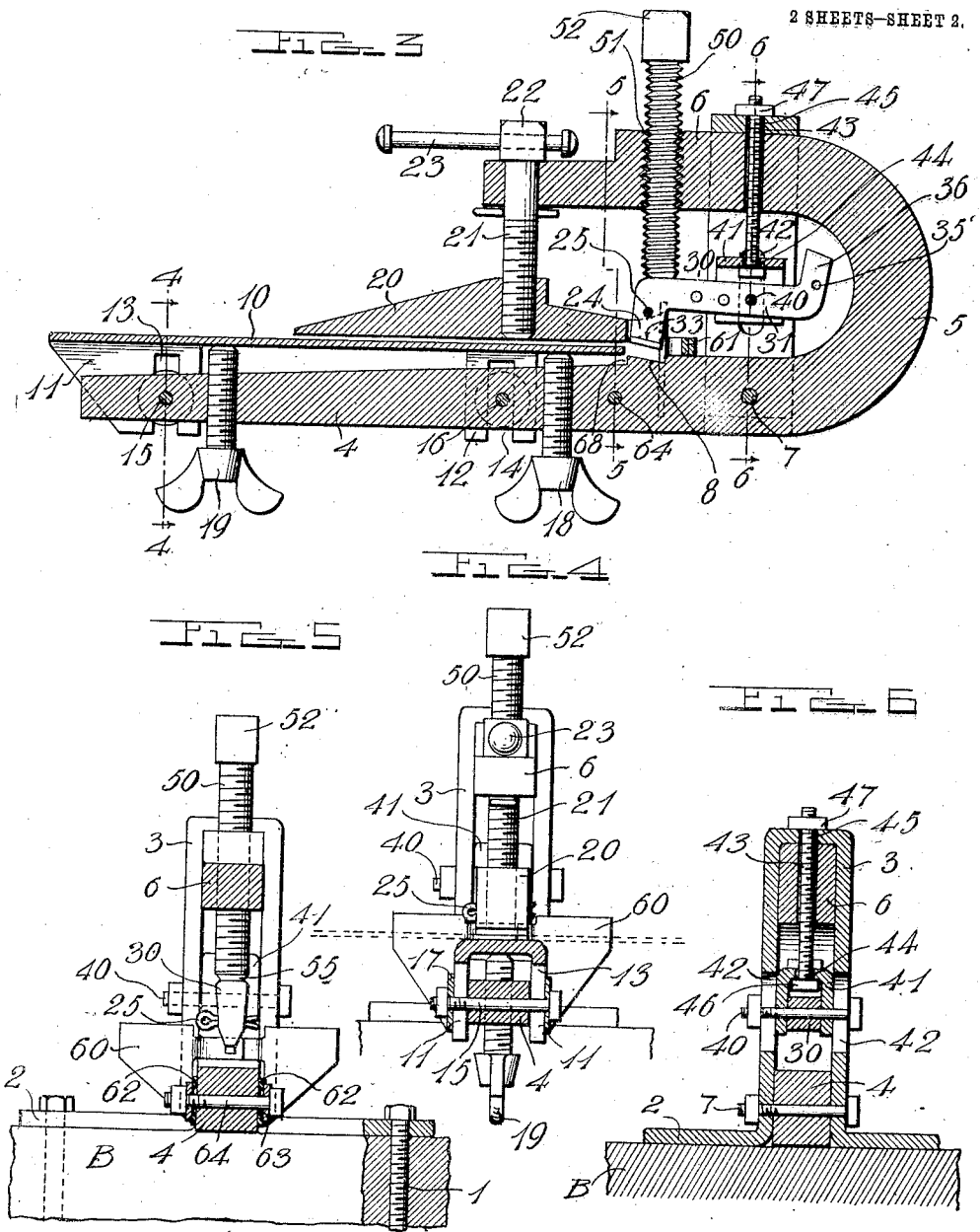

UNITED STATES PATENT OFFICE.

WALTER S. LITTLE, OF BORDEAUX, WASHINGTON.

SAW-SET.

1,055,061.  Specification of Letters Patent.  Patented Mar. 4, 1913.

Application filed October 14, 1912. Serial No. 725,688.

*To all whom it may concern:*

Be it known that I, WALTER S. LITTLE, a citizen of the United States, residing at Bordeaux, in the county of Thurston and State of Washington, have invented certain new and useful Improvements in Saw-Sets; and I do declare the following to be a full, clear, and exact description of the invention, such as will enable others skilled in the art to which it appertains to make and use the same.

This invention relates to metal tools and implements, and more especially to saws; and the object of the same is to produce an improved screw-operated saw setting machine adapted to act on the teeth of an ordinary or a circular saw and possessing various points of adjustment so that it may be readily adapted to saws of different size and to teeth of different size. These and other objects are accomplished by constructing the device in the manner hereinafter more fully described and claimed, and as shown in the drawings wherein—

Figure 1 is a side elevation and Fig. 2 a plan view of this machine complete. Fig. 3 is a central longitudinal sectional view. Figs. 4, 5, and 6 are cross-sections on the lines 4—4, 5—5, and 6—6 respectively of Fig. 3. Figs. 7 and 8 are perspective details of parts which will be hereinafter referred to.

In the drawings the letter B designates in the present instance a work bench to which by screws or bolts 1 are secured the feet 2 of an arch 3, the same extending transversely across a substantially U-shaped member constituting the framework of this machine and including a base 4 standing parallel with the face of the bench and passing through the arch, an upbent neck 5, and an overhanging arm 6 standing over and disposed some distance above the base and supported rigidly with relation thereto by the top of the arch 3. The base is secured between the arms of said arch by means of a cross bolt or rivet 7, and it projects for some distance beyond the edge of the work bench B as best seen in Fig. 1. At a proper point its upper face is provided with the anvil 8 upon which the saw teeth are to be set in a manner well known in this art.

The saw clamp comprises two jaws—the lower jaw or table 10 and the upper jaw or clamp 20. Said table has a flat body overlying the base 4 as best seen in Fig. 3, and downturned wings 11 and 12 at its front and rear ends, and at both sides, both provided with upright slots 13 and 14 respectively which are engaged by adjusting bolts 15 and 16 having washers 17 under their heads and nuts as seen in Fig. 4; and the front and rear ends of this table are raised by set screws 18 and 19 which are threaded upward through the base 4,—the obvious function of the bolts 15 and 16 being to hold the table after it has been adjusted by means of said set screws. The upper jaw 20 of the clamp overlies the lower jaw or table 10 and is raised or lowered by means of a screw 21 which is threaded into this jaw, extends thence outward, and is swiveled as at 22 through the arm 6 and has a hand piece 23 at its upper end by which it may be rotated. The inner end of the clamp 20 is forked as indicated at 24, its fork arms standing astride the setting die and beneath a cross pin 25 therethrough. By this important detail of construction, when the clamp is raised by rotating the screw 21 in the proper direction, the fork 24 raises the inner end of the die so that a clear space for the saw blade is left between the lower face of the clamp and the die on the one hand, and the upper face of the table 10 and the anvil 8 on the other hand. It might be stated at this point that in order to adjust the degree of deflection which it is desired to give the tooth, not only may the position and path of movement of the die be adjusted in a manner hereinafter described, but the angle of the table to the anvil can be adjusted by the means just explained in detail and the looseness of the screw 21 where it is swiveled as at 22 in the arm 6 will permit the lower face of the clamp to remain ever parallel with the upper face of the table.

The die 30 (best seen in detail in Fig. 8) has a straight body 31 pierced with a number of holes 32 for a purpose yet to appear, and one end 33 is turned downward and reduced as at 34 and also pierced with a transverse hole 35 for the passage of the pin 25 above mentioned, while the other end 36 is turned upward, has a similar hole 35', but its face or extremity 36' is shaped differently from the reduced end 34 so that this extremity of the die may be used where the teeth are wider. In fact, in providing the finished machine, it is quite possible that a number of these dies will be furnished with it, each having its extremities or working faces differing from each other, and from all others, and the operator will use whatever die is necessary and turn it in such position that it will coact with the anvil 8.

Through one of the holes 32 is passed a cross bolt 40, which passes next through an inverted U-shaped yoke 41 (see Fig. 6) and thence through upright slots 42 in the sides of the arch 3; and the result is that by adjusting the position of this bolt within said slots the die may be raised and lowered so that its extremity can be caused to coact with the angularity of the anvil 8, and by adjusting the bolt 40 into one of the other holes 32 in the body 31 of the die the working extremity of the latter can be set so as to stand directly over the anvil 8 at all times. If the die be made double, as illustrated in Figs. 8 and 3, the upturned rear end 36' is idle while the front end 33 is active as therein shown. If means are desired for adjusting the vertical position of the yoke 41, other than by raising and lowering the bolt 40, I may employ an upright bolt 43 passing loosely at 44 through the top of the yoke and swiveled as at 45 through the top of the arch, its head 46 standing within the yoke and therefore preventing its rotation and its nut 47 lying on top of the arch where it may be reached by a suitable wrench. By turning this nut to the right the yoke and with it the die is raised, and by turning it to the left said parts are permitted to descend. To replace the die by another, the cross bolt 40 is removed and the nut 47 taken off of the upright bolt after which the yoke and die can be drawn entirely out of the arch and another inserted, and then these parts replaced.

An important feature of my invention is the set screw 50 by means of which the active end of the die is borne downward upon the saw tooth to set it on the anvil 8. This is well shown in Fig. 3 as consisting of an ordinary headed set screw, but its threads are loose within the threaded aperture 51 through the arm 6, and its head 52 is rather large and squared so as to receive the eye 53 of a wrench 54 as shown in Fig. 7. I propose to set the saw teeth by a combination of movements. When the saw blade is passed into the clamp against the gage (yet to be described) and over the anvil, the set screw 50 is first run downward so that its lower end 55 bears upon the die 30 directly above the working extremity of the latter and presses the face 34 thereof down onto the tooth; and by turning the wrench 54, considerable pressure may be thrown onto the tooth and perhaps, with saws of certain kinds of steel, the tooth may be set by this means alone. However, as the stiffness of the tooth will offer resistance to the downward progress of the screw 50, the upper faces of its threads will contact with the lower faces of the threads within the aperture 51 during this downward movement, with the result that a certain looseness exists between these two sets of threads. Finally, and especially with saws whose material, temper and thickness is sufficient, the operator will remove the wrench 54 and strike the head 52 of the screw a considerable blow with his hammer—this drives the screw downward as the looseness of its threads permits, and the result is that the tooth is set by a compound movement consisting of initial pressure and a final blow.

The gage above referred to has an upright flat body 60 standing across the upper face of the base 4 just in rear of the anvil 8, and directly behind the latter said body is deflected to the rear as at 61 so that at this point it rests on the face of the base 4 and holds the gage in proper position. At either side of said base the metal plate from which the gage is formed is bent forward into a wing 62 provided with a slot 63, and through the slots of the two wings passes a cross bolt 64 (see Fig. 5) which is obviously for the purpose of adjusting the gage forward and backward. This adjustment regulates the depth to which the teeth shall be set, and it is my purpose to make the anvil 8 as broad as the broadest tooth of any saw upon which this machine may be used and then adjust the gage accordingly, as shown in Fig. 1. It is quite possible that, when the machine is used on circular saws, another gage will be substituted whose body is slightly curved; but as only one or two teeth are present at any time within the machine, and absolutely only one is set at a time, I apprehend no difficulty in this respect. Just forward of the anvil 8 the face of the base 4 is shouldered or dropped as indicated at 68 in Figs. 1 and 3, so as to provide a recess sufficiently deep for the thickness of the table 10, and when the latter is let down into this recess by unscrewing the screws 18 and 19 the extent of the deflection of each tooth will be the greatest possible with this machine, and the depth of the set may be gaged accordingly by adjusting the gage forward or backward over the anvil 8. The parts are of course entirely of metal, tempered where great strength is needed, and proportioned as necessary. The uses of saw-setting machines are too well known to need repetition here.

What is claimed as new is:

1. In a saw set, the combination with a base having an anvil, a die, and means for deflecting the latter; of a saw clamp comprising a table overlying the base and having downturned wings alongside its edges provided with upright slots, cross bolts through the base and through said slots, set screws passing upward through the base beneath said table, an upper jaw overlying said table, and means for raising and lowering said upper jaw.

2. In a saw set, the combination with a base having an anvil, a die, and means for deflecting the latter; of a saw clamp comprising a table overlying the base and having downturned wings alongside its edges provided with upright slots, cross bolts through the base and through said slots, set screws passing upward through the base beneath said table, an upper jaw overlying said table, an upright screw threaded into this jaw, a neck rising from the rear of the base, an arm projecting forward from said neck, and a swiveled connection between said upright screw and arm.

3. In a saw set, the combination with a substantially U-shaped frame including a base, a curved neck, and an arm overlying said base, the latter being provided with an anvil; of a saw clamp including a table adjustably mounted on the base, an upper jaw overlying said table and adjustably connected with said arm, and a fork at the inner end of said upper jaw; a die having a downturned front end standing above said anvil, means for supporting the rear end of the die, means for depressing its front ends, and a transverse pin through the latter engaged by said fork of the upper jaw, for the purpose set forth.

4. In a saw set, the combination with an upright arch having vertical slotted sides, a substantially U-shaped frame inclosed within said arch and having an anvil, a die having a downturned front end standing over said anvil, and means for depressing this end; of a yoke slidably mounted within said arch, a cross bolt passing through the body of the die, the yoke, and the slot in the arch, and means for adjusting said yoke vertically.

5. In a saw set, the combination with an upright arch having vertical slotted sides, a substantially U-shaped frame inclosed within said arch and having an anvil, a die having a downturned front end standing over said anvil, and means for depressing this end; of a yoke slidably mounted within said arch, a cross bolt passing through the body of the die, the yoke, and the slot in the arch, an upright bolt swivelly mounted through the top of the yoke and through the upper arm of the frame and the top of the arch, and a nut on the upper extremity of this bolt, for the purpose set forth.

6. In a saw set, a substantially U-shaped frame having an anvil, a die having a downturned front end standing over said anvil, and means for depressing this end; of a yoke, a cross bolt passing through the body of the die, and the yoke, an upright bolt swivelly mounted through the top of the yoke and through the upper arm of the frame, and a nut on the upper extremity of this bolt, for the purpose set forth.

7. In a saw set, the combination with a base having an anvil, an arm rigidly supported over said base and having a screw-threaded hole above said anvil, and a die loosely supported at its rear end and having its forward end provided with an active face coacting with said anvil; of a screw whose threads loosely engage those of said threaded hole and whose tip stands above the working end of the anvil, its head being enlarged and standing above said arm, whereby the screw may be run downward to bend the saw tooth and its head may be given a stroke to effect the final setting of said tooth.

In testimony whereof I have hereunto set my hand in presence of two subscribing witnesses.

WALTER S. LITTLE.

Witnesses:
 WM. P. BERRY,
 OBUT R. HEMSING.